United States Patent
Florea et al.

(10) Patent No.: US 8,212,882 B2
(45) Date of Patent: *Jul. 3, 2012

(54) HANDHELD ARTICLE WITH MOVEMENT DISCRIMINATION

(75) Inventors: Corneliu Florea, Bucuresti (RO); Felix Albu, Bucuresti (RO); Adrian Zamfir, Bucuresti (RO); Alexandru Drimbarean, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 133 days.

This patent is subject to a terminal disclaimer.

(21) Appl. No.: 12/789,300

(22) Filed: May 27, 2010

(65) Prior Publication Data

US 2010/0238309 A1    Sep. 23, 2010

Related U.S. Application Data

(63) Continuation of application No. 11/690,836, filed on Mar. 25, 2007, now Pat. No. 7,773,118.

(51) Int. Cl.
*H04N 5/228* (2006.01)
(52) U.S. Cl. .............. 348/208.99; 348/208.3; 348/208.6
(58) Field of Classification Search . 348/208.99–208.16
See application file for complete search history.

(56) References Cited

U.S. PATENT DOCUMENTS

| | | |
|---|---|---|
| 5,251,019 A | 10/1993 | Moorman et al. |
| 5,374,956 A | 12/1994 | D'luna |
| 5,392,088 A | 2/1995 | Abe et al. |
| 5,428,723 A | 6/1995 | Ainscow et al. |
| 5,510,215 A | 4/1996 | Prince et al. |
| 5,599,766 A | 2/1997 | Boroson et al. |
| 5,686,383 A | 11/1997 | Long et al. |
| 5,747,199 A | 5/1998 | Roberts et al. |
| 5,751,836 A | 5/1998 | Wildes et al. |
| 5,756,239 A | 5/1998 | Wake |
| 5,756,240 A | 5/1998 | Roberts et al. |
| 5,802,220 A | 9/1998 | Black et al. |
| 5,889,277 A | 3/1999 | Hawkins et al. |
| 5,889,554 A | 3/1999 | Mutze |
| 5,909,242 A | 6/1999 | Kobayashi et al. |
| 5,981,112 A | 11/1999 | Roberts |
| 6,028,960 A | 2/2000 | Graf et al. |
| 6,035,072 A | 3/2000 | Read |

(Continued)

FOREIGN PATENT DOCUMENTS

DE    3729324 A1    3/1989

(Continued)

OTHER PUBLICATIONS

Baker S., et al., Lucas Kanade 20 Years on: A Unifying Framework, International Journal of Computer Vision 2004, Springer Netherlands, 2004, vol. 56 (3), pp. 221-255.

(Continued)

*Primary Examiner* — Jason Chan
*Assistant Examiner* — Pritham Prabhakher
(74) *Attorney, Agent, or Firm* — Andrew V. Smith

(57) ABSTRACT

A digital camera 10 has a pair of angular rate-sensing gyroscopic sensors 130 with mutually perpendicular axes and an electronic circuit 120 responsive to the sensor output signals to discriminate between voluntary and involuntary movements of the article as a function of the number of zero crossings per unit time of the signal and the average of the absolute amplitude of the signal.

45 Claims, 3 Drawing Sheets

U.S. PATENT DOCUMENTS

| | | |
|---|---|---|
| 6,041,078 A | 3/2000 | Rao |
| 6,061,462 A | 5/2000 | Tostevin et al. |
| 6,081,606 A | 6/2000 | Hansen et al. |
| 6,114,075 A | 9/2000 | Long et al. |
| 6,122,017 A | 9/2000 | Taubman |
| 6,124,864 A | 9/2000 | Madden et al. |
| 6,134,339 A | 10/2000 | Luo |
| 6,269,175 B1 | 7/2001 | Hanna et al. |
| 6,297,071 B1 | 10/2001 | Wake |
| 6,297,846 B1 | 10/2001 | Edanami |
| 6,326,108 B2 | 12/2001 | Simons |
| 6,330,029 B1 | 12/2001 | Hamilton et al. |
| 6,360,003 B1 | 3/2002 | Doi et al. |
| 6,365,304 B2 | 4/2002 | Simons |
| 6,381,279 B1 | 4/2002 | Taubman |
| 6,387,577 B2 | 5/2002 | Simons |
| 6,407,777 B1 | 6/2002 | DeLuca |
| 6,535,244 B1 | 3/2003 | Lee et al. |
| 6,555,278 B1 | 4/2003 | Loveridge et al. |
| 6,567,536 B2 | 5/2003 | McNitt et al. |
| 6,599,668 B2 | 7/2003 | Chari et al. |
| 6,602,656 B1 | 8/2003 | Shore et al. |
| 6,607,873 B2 | 8/2003 | Chari et al. |
| 6,618,491 B1 | 9/2003 | Abe |
| 6,625,396 B2 | 9/2003 | Sato |
| 6,643,387 B1 | 11/2003 | Sethuraman et al. |
| 6,741,960 B2 | 5/2004 | Kim et al. |
| 6,863,368 B2 | 3/2005 | Sadasivan et al. |
| 6,892,029 B2 | 5/2005 | Tsuchida et al. |
| 6,947,609 B2 | 9/2005 | Seeger et al. |
| 6,961,518 B2 | 11/2005 | Suzuki |
| 7,019,331 B2 | 3/2006 | Winters et al. |
| 7,072,525 B1 | 7/2006 | Covell |
| 7,084,037 B2 | 8/2006 | Gamo et al. |
| 7,160,573 B2 | 1/2007 | Sadasivan et al. |
| 7,177,538 B2 * | 2/2007 | Sato et al. ............ 396/55 |
| 7,180,238 B2 | 2/2007 | Winters |
| 7,195,848 B2 | 3/2007 | Roberts |
| 7,292,270 B2 * | 11/2007 | Higurashi et al. ......... 348/208.3 |
| 7,315,324 B2 | 1/2008 | Cleveland et al. |
| 7,315,630 B2 | 1/2008 | Steinberg et al. |
| 7,315,631 B1 | 1/2008 | Corcoran et al. |
| 7,316,630 B2 | 1/2008 | Tsukada et al. |
| 7,316,631 B2 | 1/2008 | Tsunekawa |
| 7,317,815 B2 | 1/2008 | Steinberg et al. |
| 7,336,821 B2 | 2/2008 | Ciuc et al. |
| 7,369,712 B2 | 5/2008 | Steinberg et al. |
| 7,403,643 B2 | 7/2008 | Ianculescu et al. |
| 7,453,493 B2 * | 11/2008 | Pilu ............ 348/208.6 |
| 7,453,510 B2 | 11/2008 | Kolehmainen et al. |
| 7,460,695 B2 | 12/2008 | Steinberg et al. |
| 7,469,071 B2 | 12/2008 | Drimbarean et al. |
| 7,489,341 B2 * | 2/2009 | Yang et al. ............ 348/208.99 |
| 7,548,256 B2 * | 6/2009 | Pilu ............ 348/208.3 |
| 7,551,755 B1 | 6/2009 | Steinberg et al. |
| 7,565,030 B2 | 7/2009 | Steinberg et al. |
| 7,593,144 B2 | 9/2009 | Dymetman |
| 7,623,153 B2 * | 11/2009 | Hatanaka ............ 348/208.3 |
| 7,657,172 B2 | 2/2010 | Nomura et al. |
| 7,692,696 B2 | 4/2010 | Steinberg et al. |
| 7,738,015 B2 | 6/2010 | Steinberg et al. |
| 2001/0036307 A1 | 11/2001 | Hanna et al. |
| 2002/0006163 A1 | 1/2002 | Hibi et al. |
| 2003/0052991 A1 | 3/2003 | Stavely et al. |
| 2003/0058361 A1 | 3/2003 | Yang |
| 2003/0091225 A1 | 5/2003 | Chen |
| 2003/0103076 A1 | 6/2003 | Neuman |
| 2003/0151674 A1 | 8/2003 | Lin |
| 2003/0152271 A1 | 8/2003 | Tsujino et al. |
| 2003/0169818 A1 | 9/2003 | Obrador |
| 2003/0193699 A1 | 10/2003 | Tay |
| 2003/0219172 A1 | 11/2003 | Caviedes et al. |
| 2004/0066981 A1 | 4/2004 | Li et al. |
| 2004/0076335 A1 | 4/2004 | Kim |
| 2004/0090532 A1 | 5/2004 | Imada |
| 2004/0120598 A1 | 6/2004 | Feng |
| 2004/0120698 A1 | 6/2004 | Hunter |
| 2004/0130628 A1 | 7/2004 | Stavely |
| 2004/0145659 A1 | 7/2004 | Someya et al. |
| 2004/0169767 A1 | 9/2004 | Norita et al. |
| 2004/0212699 A1 | 10/2004 | Molgaard |
| 2004/0218057 A1 | 11/2004 | Yost et al. |
| 2004/0218067 A1 | 11/2004 | Chen et al. |
| 2004/0247179 A1 | 12/2004 | Miwa et al. |
| 2005/0010108 A1 | 1/2005 | Rahn et al. |
| 2005/0019000 A1 | 1/2005 | Lim et al. |
| 2005/0031224 A1 | 2/2005 | Prilutsky et al. |
| 2005/0041121 A1 | 2/2005 | Steinberg et al. |
| 2005/0041123 A1 | 2/2005 | Ansari et al. |
| 2005/0047672 A1 | 3/2005 | Ben-Ezra et al. |
| 2005/0052553 A1 | 3/2005 | Kido et al. |
| 2005/0057687 A1 | 3/2005 | Irani et al. |
| 2005/0068446 A1 | 3/2005 | Steinberg et al. |
| 2005/0068452 A1 | 3/2005 | Steinberg et al. |
| 2005/0140801 A1 | 6/2005 | Prilutsky et al. |
| 2005/0140829 A1 | 6/2005 | Uchida et al. |
| 2005/0195317 A1 | 9/2005 | Myoga |
| 2005/0201637 A1 | 9/2005 | Schuler et al. |
| 2005/0219391 A1 | 10/2005 | Sun et al. |
| 2005/0231625 A1 | 10/2005 | Parulski et al. |
| 2005/0248660 A1 | 11/2005 | Stavely et al. |
| 2005/0259864 A1 | 11/2005 | Dickinson et al. |
| 2005/0270381 A1 | 12/2005 | Owens et al. |
| 2005/0281477 A1 | 12/2005 | Shiraki et al. |
| 2006/0006309 A1 | 1/2006 | Dimsdale et al. |
| 2006/0017837 A1 | 1/2006 | Sorek et al. |
| 2006/0038891 A1 | 2/2006 | Okutomi et al. |
| 2006/0039690 A1 | 2/2006 | Steinberg et al. |
| 2006/0093212 A1 | 5/2006 | Steinberg et al. |
| 2006/0098237 A1 | 5/2006 | Steinberg et al. |
| 2006/0098890 A1 | 5/2006 | Steinberg et al. |
| 2006/0098891 A1 | 5/2006 | Steinberg et al. |
| 2006/0119710 A1 | 6/2006 | Ben-Ezra et al. |
| 2006/0120599 A1 | 6/2006 | Steinberg et al. |
| 2006/0125938 A1 | 6/2006 | Ben-Ezra et al. |
| 2006/0133688 A1 | 6/2006 | Kang et al. |
| 2006/0140455 A1 | 6/2006 | Costache et al. |
| 2006/0170786 A1 | 8/2006 | Won |
| 2006/0171464 A1 | 8/2006 | Ha |
| 2006/0187308 A1 | 8/2006 | Lim et al. |
| 2006/0204034 A1 | 9/2006 | Steinberg et al. |
| 2006/0204054 A1 | 9/2006 | Steinberg et al. |
| 2006/0204110 A1 | 9/2006 | Steinberg et al. |
| 2006/0285754 A1 | 12/2006 | Steinberg et al. |
| 2007/0025714 A1 | 2/2007 | Shiraki |
| 2007/0058073 A1 | 3/2007 | Steinberg et al. |
| 2007/0083114 A1 | 4/2007 | Yang et al. |
| 2007/0086675 A1 | 4/2007 | Chinen et al. |
| 2007/0097221 A1 | 5/2007 | Stavely et al. |
| 2007/0110305 A1 | 5/2007 | Corcoran et al. |
| 2007/0147820 A1 | 6/2007 | Steinberg et al. |
| 2007/0189748 A1 | 8/2007 | Drimbarean et al. |
| 2007/0201724 A1 | 8/2007 | Steinberg et al. |
| 2007/0234779 A1 * | 10/2007 | Hsu et al. ............ 73/1.79 |
| 2007/0269108 A1 | 11/2007 | Steinberg et al. |
| 2007/0296833 A1 | 12/2007 | Corcoran et al. |
| 2008/0012969 A1 | 1/2008 | Kasai et al. |
| 2008/0037827 A1 | 2/2008 | Corcoran et al. |
| 2008/0037839 A1 | 2/2008 | Corcoran et al. |
| 2008/0037840 A1 | 2/2008 | Steinberg et al. |
| 2008/0043121 A1 | 2/2008 | Prilutsky et al. |
| 2008/0166115 A1 | 7/2008 | Sachs et al. |
| 2008/0175481 A1 | 7/2008 | Petrescu et al. |
| 2008/0211943 A1 | 9/2008 | Egawa et al. |
| 2008/0218611 A1 | 9/2008 | Parulski et al. |
| 2008/0219581 A1 | 9/2008 | Albu et al. |
| 2008/0219585 A1 | 9/2008 | Kasai et al. |
| 2008/0220750 A1 | 9/2008 | Steinberg et al. |
| 2008/0231713 A1 | 9/2008 | Florea et al. |
| 2008/0232711 A1 | 9/2008 | Prilutsky et al. |
| 2008/0240555 A1 | 10/2008 | Nanu et al. |
| 2008/0240607 A1 | 10/2008 | Sun et al. |
| 2008/0259175 A1 | 10/2008 | Muramatsu et al. |
| 2008/0267530 A1 | 10/2008 | Lim |
| 2008/0292193 A1 | 11/2008 | Bigioi et al. |
| 2008/0309769 A1 | 12/2008 | Albu et al. |
| 2008/0309770 A1 | 12/2008 | Florea et al. |

| | | | |
|---|---|---|---|
| 2009/0003652 | A1 | 1/2009 | Steinberg et al. |
| 2009/0009612 | A1 | 1/2009 | Tico et al. |
| 2009/0080713 | A1 | 3/2009 | Bigioi et al. |
| 2009/0080796 | A1 | 3/2009 | Capata et al. |
| 2009/0080797 | A1 | 3/2009 | Nanu et al. |
| 2009/0179999 | A1 | 7/2009 | Albu et al. |
| 2009/0185041 | A1 | 7/2009 | Kang et al. |
| 2009/0185753 | A1 | 7/2009 | Albu et al. |
| 2009/0190803 | A1 | 7/2009 | Neghina et al. |
| 2009/0196466 | A1 | 8/2009 | Capata et al. |
| 2009/0284610 | A1 | 11/2009 | Fukumoto et al. |
| 2009/0303342 | A1 | 12/2009 | Corcoran et al. |
| 2009/0303343 | A1 | 12/2009 | Drimbarean et al. |
| 2010/0026823 | A1 | 2/2010 | Sawada |
| 2010/0053349 | A1 | 3/2010 | Watanabe et al. |
| 2010/0126831 | A1 | 5/2010 | Ceelen |
| 2011/0090352 | A1 | 4/2011 | Wang et al. |
| 2011/0102642 | A1 | 5/2011 | Wang et al. |

FOREIGN PATENT DOCUMENTS

| | | | |
|---|---|---|---|
| DE | 10154203 A1 | 6/2002 | |
| DE | 10107004 A1 | 9/2002 | |
| EP | 0944251 A1 | 9/1999 | |
| EP | 944251 B1 | 4/2003 | |
| EP | 1583033 A2 | 10/2005 | |
| EP | 1779322 B1 | 1/2008 | |
| EP | 1429290 B1 | 7/2008 | |
| JP | 10285542 A2 | 10/1998 | |
| JP | 11327024 A2 | 11/1999 | |
| JP | 2008-520117 T | 6/2008 | |
| WO | WO9843436 A1 | 10/1998 | |
| WO | WO0113171 A1 | 2/2001 | |
| WO | WO0245003 A1 | 6/2002 | |
| WO | WO2007093199 A2 | 8/2007 | |
| WO | WO2007093199 A3 | 8/2007 | |
| WO | WO2007142621 A1 | 12/2007 | |
| WO | WO2007143415 A2 | 12/2007 | |
| WO | WO2008017343 A1 | 2/2008 | |
| WO | WO2008131438 A2 | 10/2008 | |
| WO | WO2008151802 A1 | 12/2008 | |
| WO | WO2009036793 A1 | 3/2009 | |

OTHER PUBLICATIONS

Bhaskaran, V. et al., Motion estimation using a computation-constrained criterion, Digital Signal Processing Proceedings, 1997, vol. 1., pp. 229-232.
Cannon M., Blind Deconvolution of Spatially Invariant Image Blurs with Phase, IEEE Transactions on Acoustics, Speech, and Signal Processing, 1976, vol. ASSP-24, No. 1. pp. 58-63.
Internet Reference: CCD Fundamentals. Canon, URL:http//:www.roper.co.jp/Html/roper/tech_note/html/tefbin.htm, Nov. 2003.
Aaron Deever: In-camera all-digital video stabilization, Proceedings of the International Conference on Decision Support Systems. Proceedings of ISDSS, Jan. 1, 2006, pp. 190-193, XP009106923.
Demir, B. et al., Block motion estimation using adaptive modified two-bit transform, 2007, pp. 215-222, vol. 1, Issue 2.
Golub G. H. et al., Matrix Computations, 1996, 3rd edition, John Hopkins University Press, Baltimore.
Bahadir K. Gunturk, Murat Gevrekci, High-Resolution Image Reconstruction From Multiple Differently Exposed Images, IEEE Signal Processing Letters, vol. 13, No. 4, Apr. 2006, pp. 197-200.
Peter A. Jannson, Deconvolution of Images and Spectra, 1997, 2nd. Edition, Academic Press.
Kuglin C. D. et al., The phase correlation image alignment method, Proc. Int. Conf. Cybernetics and Society, 1975, pp. 163-165, IEEE, Bucharest, Romania.
Liu X., et al., Photocurrent Estimation from Multiple Non-Destructive Samples in a CMOS Image Sensor, in Proceedings of the SPIE Electronic Imaging 2001 Conference, vol. 4306, San Jose, CA, Jan. 2001, pp. 450-458.
Lyndsey Pickup, et al., Optimizing and Learning for Super-resolution, BMVC, Sep. 4-7, 2006.
Russ J.C., Chapter 3: Correcting Imaging Defects, in the Image Processing Handbook, 2002, by CRC Press, LLC., 75 pages.
Shi J., et al., Good Features to Track, IEEE Conference on Computer Vision and Patern Recognition, 1994, pp. 593-600.
Tomasi C., et al., Detection and Tracking of Point Features, Carnegie Mellon University Technical Report CMU-CS-91-132, Apr. 1991.
Trimeche M., et al., Multichannel Image Deblurring of Raw Color Components, Computational Imaging III., Edited by Bouman, Charles A., Miller, Eric L., Proceedings of the SPIE, vol. 5674, pp. 169-178, 2005.
Lu Yuan, et al., Image Deblurring with Blurred/Noisy Image Pairs, SIGGRAPH07, Aug. 5-9, 2007.
Barbara Zitova, et al., Image registration methods: a survey, Image and Vision Computing, 2003, pp. 977-1000, vol. 21.
PCT International Preliminary Report on Patentability, Chapter I, for PCT Application No. PCT/EP2009/008674, dated Jun. 14, 2011, 7 pages.
PCT International Preliminary Report on Patentability, Chapter I, for PCT Application No. PCT/US2007/069638, dated Dec. 10, 2008, 5 pages.
PCT International Preliminary Report on Patentability, Chapter I, for PCT Application No. PCT/EP2008/004729, dated Dec. 17, 2009, 10 pages.
PCT Notification of Transmittal of the International Search Report and the Written Opinion of the International Searching Authority, or the Declaration, for PCT Application No. PCT/EP2010/056999, dated Sep. 1, 2010, 10 pages.
PCT Notification of Transmittal of the International Search Report and the Written Opinion of the International Searching Authority, or the Declaration, for PCT Application No. PCT/EP2009/008674, dated Mar. 29, 2010, 10 pages.
PCT Notification of Transmittal of the International Search Report and the Written Opinion of the International Searching Authority, or the Declaration, for PCT Application No. PCT/EP2008/004729, dated Oct. 29, 2008, 14 pages.
PCT Written Opinion of the International Search Authority, for PCT Application No. PCT/EP2008/004729, dated Dec. 17, 2009, 9 pages.
Final Office Action mailed Nov. 17, 2011 for U.S. Appl. No. 12/901,577, filed Oct. 11, 2010.
Non-Final Office Action mailed Dec. 7, 2011 for U.S. Appl. No. 12/789,300, filed May 27, 2010.
Non-Final Office Action mailed Dec. 8, 2011 for U.S. Appl. No. 12/820,086, filed Jun. 21, 2010.
Non-Final Office Action mailed Dec. 8, 2011 for U.S. Appl. No. 12/820,034, filed Jun. 21, 2010.
Non-Final Office Action mailed Nov. 21, 2011 for U.S. Appl. No. 12/956,904, filed Nov. 30, 2010.
Notice of Allowance mailed Nov. 25, 2011 for U.S. Appl. No. 12/485,316, filed Jun. 16, 2009.
Andrews, H.C. et al., "Digital Image Restoration", Prentice Hall, 1977.
Bates et al., "Some Implications of Zero Sheets for Blind Deconvolution and Phase Retrieval", J. Optical Soc. Am. A, 1990, pp. 468-479, vol. 7.
Ben Ezra, Moshe et al., "Motion Deblurring Using Hybrid Imaging", Proceedings IEEE Computer Society Conference on Computer Vision and Pattern Recognition, 2003.
Ben-Ezra, M. el al., "Motion-Based Motion Deblurring", IEEE Transactions on Pattern Analysis and Machine Intelligence, 2004, pp. 689-698, vol. 26-Issue 6.
Bennett, Eric P. et al., "Video Enhancement Using Per-Pixel Virtual Exposures", International Conference on Computer Graphics and Interactive Techniques, ACM Siggraph, 2005, pp. 845-852.
Bhaskaran, V. et al., "Motion estimation using a computation-constrained criterion", Digital Signal Processing Proceedings, 1997, pp. 229-232, vol. 1.
Bones et al., "Deconvolution and Phase Retrieval With Use of Zero Sheets", J. Optical Soc. Am. A, 1995, pp. 1, 842-1,857, vol. 12.
Cannon M., "Blind Deconvolution of Spatially Invariant Image Blurs with Phase," IEEE Transactions on Acoustics, Speech, and Signal Processing, 1976, vol. ASSP-24, No. 1.
Co-pending U.S. Appl. No. 11/573,713, US-2009-0273685 A1 Nov. 5, 2009 Mihai Ciuc et al.
Co-pending U.S. Appl. No. 12/063,089 US-2009-0263022 A1 Oct. 22, 2009 Petrescu et al.

Co-pending U.S. Appl. No. 12/330,719 US-2009-0167893 A1 Jul. 2, 2009 Susanu et al.

Crowley, J. et al., "Multi-modal tracking of faces for video communication, http://citeseer.ist.psu.edu/crowley97multimodal.html", in Computer Vision and Patent Recognition, 1997.

Deever, A., "In-camera all-digital video stabilization", Proceedings of the International Conference on Decision Support Systems.Proceedings of ISDSS, 2006, pp. 190-193.

Deller J. et al., "Discrete-Time Processing of Speech Signals," 1999, 2nd. Edition, Wiley-IEEE Press.

Deller, John R. Jr et al., "Discrete-Time Processing of Speech Signals", 1993, 908 pages, IEEE Press Classic Reissue (Hardcover).

Demir, B. et al., "Block motion estimation using adaptive modified two-bit transform", 2007, pp. 215-222, vol. 1-Isuue 2.

Deng G. et al., "The study of logarithmic image processing model and its application to image enhancement," IEEE Trans. on Image Processing, 1995, pp. 506-512, vol. 4.

Dufournaud et al., "Matching Images With Different Resolutions", IEEE Conference Proceedings on Computer Vision and Pattern Recognition, 2000.

Elad et al., "Restoration of a Single Superresolution Image from several Blurred, Noisy and Undersampled Measured Images", IEEE Transactions on Image Processing, 1997, vol. 6-Issue 12.

Elad, Michael et al., "Superresolution Restoration of an Image Sequence: Adaptive Filtering Approach", IEEE Transactions on Image Processing, 1999, pp. 529-541, vol. 8-Issue 3.

Favaro, Paolo, "Depth from focus/defocus, http://homepages.inf.ed.ac.uk/rbf/Cvonline/LOCAL_COPIES/FAVARO1/dfdtutorial.html.", 2002.

Feng, J. et al., "Adaptive block matching motion estimation algorithm using bit plane matching", ICIP, 1995, pp. 496-499.

Final Office Action mailed May 27, 2010, for U.S. Appl. No. 11/753,098, filed May 24, 2007.

Final Office Action mailed Nov. 5, 2008, for U.S. Appl. No. 10/986,562, filed Nov. 10, 2004.

Final Office Action mailed Nov. 13, 2008, for U.S. Appl. No. 10/985,657, filed Nov. 10, 2004.

Final Office Action mailed Nov. 13, 2008, for U.S. Appl. No. 11/566,180, filed Dec. 1, 2006.

Final Office Action mailed Nov. 24, 2008, for U.S. Appl. No. 10/985,650, filed Nov. 10, 2004.

Fujita K. et al., An edge-adaptive iterative method for image restoration, Singapore ICCS/ISITA '92."Communications on the Move" Singapore, Nov. 16-20, 1992, New York, NY, USA, IEEE, US, Nov. 16, 1992, pp. 361-365, XP010066997, ISBN: 0-7803-0803-4.

Golub G. H. et al., "Matrix Computations," 1996, 3rd edition, John Hopkins University Press, Baltimore.

Gunturk et al., "High-Resolution Image Reconstruction from Multiple Differently Exposed Images," IEEE Signal Processing Letters, 2006, vol. 13, No. 4.

Hayes M., "Statistical Digital Signal Processing and Modeling," 1996, Wiley.

Haykin S., "Adaptive filter theory," 1996, Prentice Hall.

Jannson, Peter A., "Deconvolution of Images and Spectra," 1997, 2nd. Edition, Academic Press.

Jansson, Peter A., "Chapter 1: Convolution and Related Concepts", Deconvolution of Images and Spectra, 1997, 2nd. Edition, Academic Press.

Jourlin M. et al., "Logarithmic image processing the mathematical and physical framework for the representation and processing of transmitted images," Advances in Imaging and Electron Physics, 2001, pp. 129-196, vol. 115.

Ko, S. et al., "Fast digital image stabilizer based on gray-coded bit-plane matching", IEEE Transactions on Consumer Electronics, 1999, pp. 598-603, vol. 45-Issue 3.

Kuglin C. D. et al., "The phase correlation image alignment method," Proc. Int. Conf. Cybernetics and Society, 1975, pp. 163-165, IEEE, Bucharest, Romania.

Lagendijk R. L. et al., "Iterative Identification and Restoration of Images," 1991, Kluwer Academic.

Lane et al., "Automatic multidimensional deconvolution", J. Opt. Soc. Am. A, 1987, pp. 180-188, vol. 4-Issue 1.

Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27-Issue 3, IEEE Comput. Soc.

Mase, Mitsuhito et al., "A Wide Dynamic Range CMOS tmage Sensor with Multiple Exposure-Time Signal Outputs and 12-bit Column-Parallel Cyclic A/D Converters", IEEE Journal of Solid-State Circuits, 2005, vol. 40-Issue 12.

Natarajan B. et al., "Low-complexity block-based motion estimation via one-bit transforms", IEEE Trans. Circuit Syst. Video Technol, 1997, pp. 702-706, vol. 7-Issue 5.

Non-Final Office Action mailed Apr. 3, 2008, for U.S. Appl. No. 10/985,650, filed Nov. 10, 2004.

Non-Final Office Action mailed Apr. 4, 2008, for U.S. Appl. No. 10/986,562, filed Nov. 10, 2004.

Non-Final Office Action mailed Apr. 21, 2009, for U.S. Appl. No. 10/985,650, filed Nov. 10, 2004.

Non-Final Office Action mailed Apr. 22, 2009, for U.S. Appl. No. 10/986,562, filed Nov. 10, 2004.

Non-Final Office Action mailed Jan. 20, 2010, for U.S. Appl. No. 11/690,836, filed Mar. 25, 2007.

Non-Final Office Action mailed Jun. 1, 2009, for U.S. Appl. No. 10/985,657, filed Nov. 10, 2004.

Non-Final Office Action mailed Jun. 10, 2009, for U.S. Appl. No. 11/566,180, filed Dec. 1, 2006.

Non-Final Office Action mailed Mar. 18, 2008, for U.S. Appl. No. 10/985,657, filed Nov. 10, 2004.

Non-Final Office Action mailed Mar. 21, 2008, for U.S. Appl. No. 11/566,180, filed Dec. 1, 2006.

Non-Final Office Action mailed May 11, 2009, for U.S. Appl. No. 12/199,680, filed Aug. 27, 2008.

Non-Final Office Action mailed May 29, 2009, for U.S. Appl. No. 12/199,710, filed Aug. 27, 2008.

Non-Final Office Action mailed Nov. 4, 2009, for U.S. Appl. No. 11/753,098, filed May 24, 2007.

Notice of Allowance mailed Apr. 29, 2010, for U.S. Appl. No. 11/690,836, filed Mar. 25, 2007.

Notice of Allowance mailed Dec. 1, 2009, for U.S. Appl. No. 12/199,680, filed Aug. 27, 2008.

Notice of Allowance mailed Dec. 11, 2009, for U.S. Appl. No. 12/199,710, filed Aug. 27, 2008.

Notice of Allowance mailed Nov. 2, 2009, for U.S. Appl. No. 10/985,657, filed Nov. 10, 2004.

Notice of Allowance mailed Nov. 17, 2009, for U.S. Appl. No. 11/566,180, filed Dec. 1, 2006.

Notice of Allowance mailed Oct. 29, 2009, for U.S. Appl. No. 10/985,650, filed Nov. 10, 2004.

Notice of Allowance mailed Oct. 29, 2009, for U.S. Appl. No. 10/986,562, filed Nov. 10, 2004.

Oppenheim, A.V. et al., "The Importance of Phase in Signals, XP008060042, ISSN: 0018-9219.", Proceedings of the IEEE, 1981, pp. 529-541, vol. 69-Issue 5.

Park, Sung Cheol et al., "Super-resolution image reconstruction: a technical overview, ISSN: 1053-5888. DOI: 10.1109/MSP.2003.1203207.", Signal Processing Magazine, 2003, pp. 21-36, vol. 20-Issue 3, IEEE Publication.

Patti A. et al., "Super-Resolution video reconstruction with arbitrary sampling lattices and non-zero aperture time http://citeseer.ist.psu.edu/patti97super.html", in IEEE Transactions on Image Processing, 1997, pp. 1064-1078.

PCT International Preliminary Report on Patentability, for PCT Application No. PCT/EP2005/011011, dated Jan. 22, 2007, 8 pages.

PCT International Preliminary Report on Patentability for PCT Application PCT/US2007/069638, dated Dec. 10, 2008, 5 pages.

PCT Notification of Transmittal of the International Search Report and the Written Opinion of the International Searching Authority, or the Declaration, for PCT Application No. PCT/EP2005/011011, dated Apr. 24, 2006, 12 pages.

PCT Notification of Transmittal of the International Search Report and the Written Opinion of the International Searching Authority, or the Declaration, for PCT Application No. PCT/EP2007/009939, dated May 21, 2008, 13 pages.

PCT Notification of Transmittal of the International Search Report and the Written Opinion of the International Searching Authority, or the Declaration, for PCT Application No. PCT/EP2008/004729, dated Oct. 29, 2008, 9 pages.

PCT Notification of Transmittal of the International Search Report and the Written Opinion of the International Searching Authority, or the Declaration for PCT application No. PCT/EP2009/008674, dated Mar. 29, 2010, 10 pages.

PCT Notification of Transmittal of the International Search Report and the Written Opinion of the International Searching Authority, or the Declaration for PCT application No. PCT/US2007/069638, dated Mar. 5, 2008, 9 pages.

PCT Written Opinion of the International Preliminary Examining Authority, PCT/EP2005/011011, dated Oct. 24, 2006, 4 pages.

Peng, She et al., "Motion View Reconstruction Method with Real Object Image based on Virtual Object Movement, http://rlinks2.dialog.com/NASApp/ChannelWEB/DialogProSerylet?ChName=engineering", Eizo Joho Media Gakkai Gijutsu Hokoku, 2005, pp. 67-70, vol. 29-Issue 17.

Pickup, Lyndsey et al., "Optimizing and Learning for Super-resolution," BMVC, Sep. 4-7, 2006.

Pulli, Kari et al., "Robust Meshes from Multiple Range Maps, http://citeseer.ist.psu.edu/pulli97robust.html", in Proc. IEEE International Conference on Recent Advances in 3-D Digital Imaging and Modeling, 1997.

Rahgozar et al., "Motion Estimation Based on Time-Sequentially Sampled Imagery", IEEE Transactions on Image Processing, 1995.

Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.

Sasaki et al., "A Wide Dynamic Range CMOS Image Sensor with Multiple Short-Time Exposures", IEEE Proceedings on Sensors, 2004, pp. 967-972, vol. 2.

Sauer, K. et al., "Efficient Block Motion Estimation Using Integral Projections", IEEE Trans. Circuits, Systems for video Tech, 1996, pp. 513-518, vol. 6-Issue 5.

Schultz, Richard R. et al., "Extraction of High-Resolution Frames from Video Sequences, http://citeseer.ist.psu.edu/schultz96extraction.html", IEEE transactions on image processing, 1996, pp. 996-1011.

Seldin et al., "Iterative blind deconvolution algorithm applied to phase retrieval", J. Opt. Soc. Am. A, 1990, pp. 428-433, vol. 7-Issue 3.

Siu, Angus et al., "Image registration for image-based rendering, http://rlinks2.dialog.com/NASApp/ChannelWEB/DialogProServlet?ChName=engineering", IEEE Transactions on Image Processing, 2005, pp. 241-252, vol. 14-Issue 2.

Trussell, H.J. et al., "Identification and restoration of spatially variant motion blurs in sequential images, XP002375828", IEEE Transactions on Image Processing, 1992, pp. 123-126, vol. 1-Issue 1.

Uomori, K. et al., "Automatic image stabilizing system by fulldigital signal processing" IEEE Transactions on Consumer Electronics, 1990, vol. 36, No. 3, pp. 510-519.

Wei, Jiang et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.

Yang, Chen-Kui et al., "Color image sharpening by moment-preserving technique", Signal Processing, 1995, pp. 397-403, vol. 45-Issue 3, Elsevier Science Publishers.

Yuan, Lu et al., "Image Deblurring with Blurred/Noisy Image Pairs," SIGGRAPH07, Aug. 5-9, 2007.

Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.

Zitova, Barbara et al., "Image registration methods: a survey," Image and Vision Computing, 2003, pp. 977-1000, vol. 21.

* cited by examiner

HANDHELD ARTICLE WITH MOVEMENT DISCRIMINATION

PRIORITY

This application is a Continuation of U.S. patent application Ser. No. 11/690,836, filed on Mar. 25, 2007, now U.S. Pat. No. 7,773,118, issued on Aug. 10, 2010, which is hereby incorporated by reference.

FIELD OF THE INVENTION

This invention relates to a handheld article, such as a digital camera, having apparatus to discriminate between voluntary and involuntary movement of the article.

BACKGROUND OF THE INVENTION

Handheld articles such as digital cameras are subject to movement in use, either involuntary (hand-jitter) or voluntary (e.g. panning). It would be useful to discriminate between these two types of movement.

The object of the present invention is to provide apparatus, in a handheld article, to discriminate between voluntary and involuntary movement of the article.

BRIEF SUMMARY OF THE INVENTION

According to the present invention there is provided a handheld article having at least one angular rate-sensing gyroscopic sensor and an electronic circuit responsive to the sensor output signal to discriminate between voluntary and involuntary movements of the article as a function of the number of zero crossings per unit time of the signal and the average of the absolute amplitude of the signal.

Preferably the article includes first and second angular rate-sensing gyroscopic sensors with transverse axes, the electronic circuit being responsive to both sensor output signals to discriminate between voluntary and involuntary movements of the article.

In an embodiment the article is a digital camera.

BRIEF DESCRIPTION OF DRAWINGS

An embodiment of the invention will now be described, by way of example, with reference to the accompanying drawings, in which.

DESCRIPTION OF PREFERRED EMBODIMENTS

Figure 1:
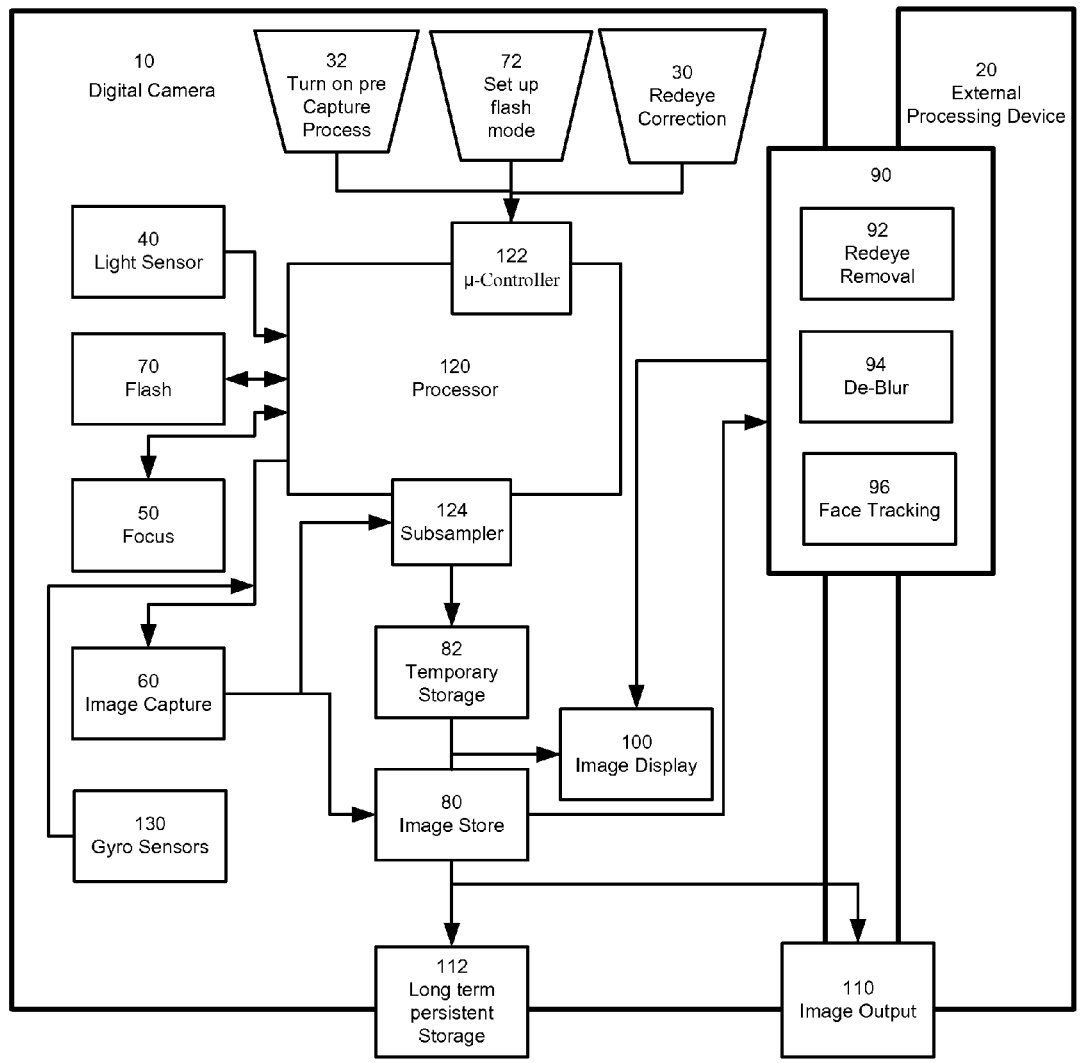
FIG. 1 is a block diagram of a digital camera operating in accordance with an embodiment of the present invention.

FIG. 1 is a block diagram of a portable digital camera 10, operating in accordance with an embodiment of the present invention. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122. The processor 120, in response to a user input at 122, such as half pressing a shutter button (pre-capture mode 32), initiates and controls the digital photographic process.

Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button.

The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, for preview images.

In the case of preview images which are generated in the pre-capture mode 32 with the shutter button half-pressed, the display 100 can assist the user in composing the image, as well as being used to determine focusing and exposure. Temporary storage 82 is used to store one or plurality of the preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combination thereof.

Various processing functions 90 carried out on the main, high-resolution, image, and/or low resolution preview images, such as redeye detection and correction 92 and de-blurring 94, can be integral to the camera 10 or part of an external processing device 20 such as a desktop computer.

The camera 10 also includes two angular rate-sensing gyroscopic sensors 130 having vertical and horizontal axes respectively (vertical and horizontal refers to the orientation of the axes when the camera is held perfectly upright and level). In the present embodiment each sensor 130 comprises an Analog Devices ADXRS401 single chip sensor capable of measuring up to 75 degrees per second about its axis. The analog output signals from the two sensors are sampled 40,000 times per second for analog-to-digital conversion and applied to the digital processor 120. This allows the processor 120 to discriminate between voluntary and involuntary movement of the camera, as well as between camera movement and electronic jitter, in the following manner.

Figure 2:
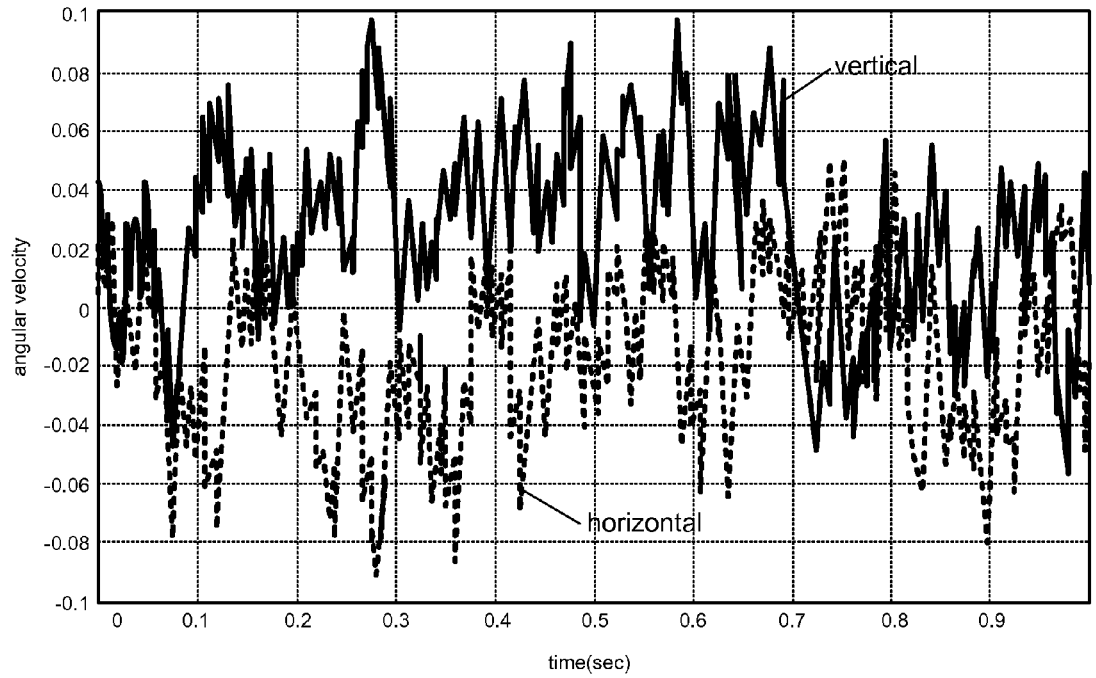
FIGS. 2 to 4 are waveforms useful in understanding the operation of the embodiment of the invention.
Figure 3:
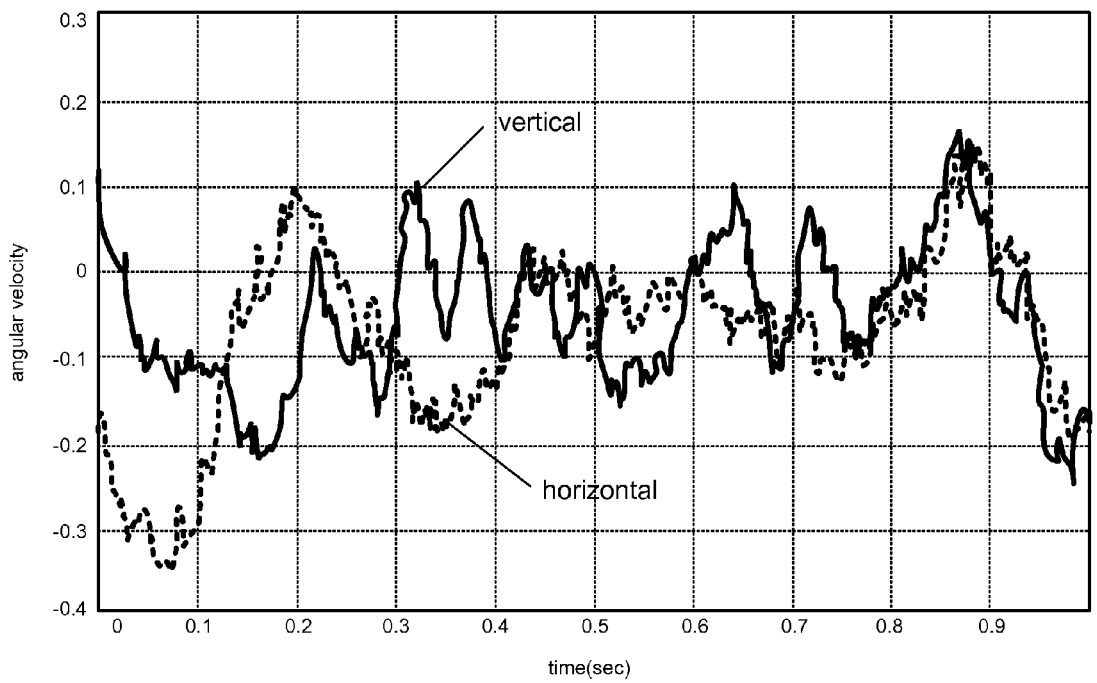

In a digital camera one may encounter three situations:
1. There is no movement (FIG. 2). The sensor output signal is solely electronic jitter (sensor noise).
2. There is involuntary hand jitter (FIG. 3). It adds to the sensor noise. Here, the hand jitter is dominant.
3. There is voluntary, desired hand movement (FIG. 4), for example, while panning to follow a moving vehicle. This adds to the involuntary hand jitter and sensor noise, but is dominant.

Sensor noise has a small amplitude and a large percentage of energy in the high frequency domain. Hand jitter increases the amplitude of the sensor output signals and the energy in the low frequency bands, while voluntary movement has the largest amplitude (due to a non-zero DC component) and most of the signal energy near zero frequency. The present embodiment discriminates between these three situations as a function of the number of zero-crossings per second NZC of each sensor signal, which is a measure of frequency, and the average of the absolute amplitude of each sensor signal $|\overline{W}|$ in Volts. The number of zero crossings per second (NZC) of a discrete signal w(n), where n=1, ... N, is:

$$NZC = \sum_{n=1}^{N-1} H(-w(n) \cdot w(n+1)), \quad \text{where } H(x) = \begin{cases} 0, & x \le 0 \\ 1, & x > 0 \end{cases}$$

The value of NZC (which refers to the number of zero crossings per second) need not be established by counting zero crossings over a full second, since NZC changes relatively slowly over time and a count of the number of zero crossings taken over, for example, $\frac{1}{10}^{th}$ of a second can be scaled up (in this example by multiplying by 10) and expressed as the number per second. The absolute amplitude of the signal is preferably averaged over the same period as the zero crossing count, but again the absolute average changes relatively slowly over time so exact correspondence is not strictly necessary.

Our tests, using two Analog Devices ADXRS401 single chip sensors mounted on a test board with mutually perpendicular axes and sensor outputs sampled at 40,000 samples per second, have shown that for the three situations above the following criteria generally apply for both horizontal and vertical components of random movement:
1. No movement: NZC∈[180; 250] and $|\overline{W}|$∈[0.01; 0.025]
2. Hand jitter: NZC∈[50; 160] and $|\overline{W}|$∈[0.03, 0.2]
3. Voluntary movement: NZC<10 and $|\overline{W}|$>0.5.

Figure 4:
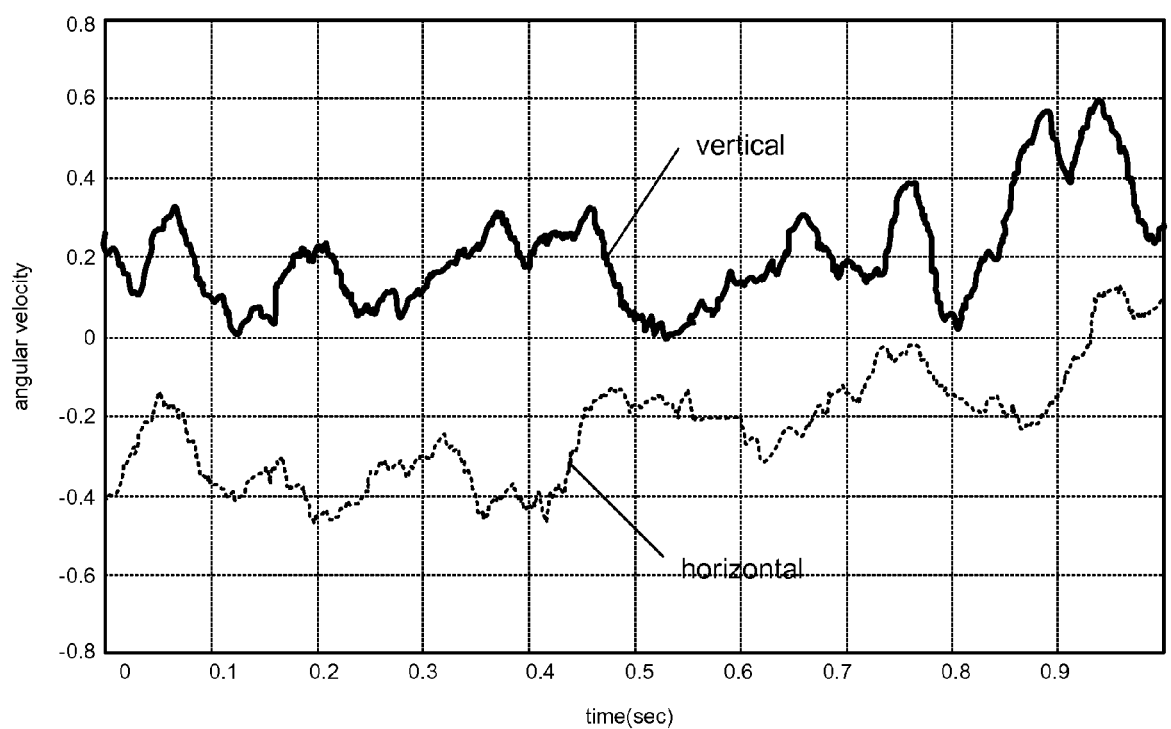

These ranges can therefore be used for discriminating between the three situations. However, unless the movement is predominantly in one direction, the discrimination is likely to be less accurate if the criteria for only one direction (horizontal or vertical) are used for a decision, as one can see in the example below (FIG. 4, $NZC_{hor}$).

Therefore, we have found that a high degree of discrimination accuracy can be obtained by combining the criteria and computing the term:

$$TH = \frac{NZC_{hor}}{|\overline{W}|_{hor}} + \frac{NZC_{vert}}{|\overline{W}|_{vert}}$$

In our tests, we found empirically that if TH were greater than 1200, noise was the predominant factor; if not, hand jitter was present. We found this 1200 threshold to be highly accurate in discriminating between sensor noise and hand jitter. In our tests there were 2% false alarms (noise detected as jitter) and 1.8% misdetection. In 0.16% cases the test indicated voluntary movement instead of hand jitter.

To discriminate between hand jitter and voluntary movement we compared TH with 400, which we found empirically to be a useful threshold to differentiate between these two types of movement. A TH of less than 400 indicated voluntary movement while a TH greater than 400 indicated hand jitter. For soft movements it is hard to define the physical threshold between hand jitter and a voluntary movement. For hard movements, however, the tests proved 100% accurate.

Of course, if different sensors are used, there will be different threshold levels.

FIGS. 2 to 4 are typical waveforms of the sensor outputs for the three situations referred to above.

FIG. 2: Pure sensor noise. As one can see, both of the records have many zero-crossings, but no significant DC component. The high frequencies are much more important as compared to other cases. The energy level is low. The values computed from these records are:
$NZC_{hor}$=321
$NZC_{vert}$=140
$|\overline{W}|_{hor}$=0.025
$|\overline{W}|_{vert}$=0.0034
TH=54016.47

FIG. 3: Hand jitter is predominant. As one can see, both of the records have insignificant DC components and a rather high number of zero-crossings. The values computed from these records are:
$NZC_{hor}$=78
$NZC_{vert}$=119
$|\overline{W}|_{hor}$=0.093
$|\overline{W}|_{vert}$=0.079
TH=2345.03

FIG. 4: Voluntary movement is predominant. As one can see, both of the records have significant DC components which decreases the number of zero-crossings. The DC component shows the existence of the voluntary movement. The values computed from these records are:
$NZC_{hor}$=15
$NZC_{vert}$=0
$|\overline{W}|_{hor}$=0.182
$|\overline{W}|_{vert}$=0.284
TH=82.42

The above technique is embodied in the camera 10 by the processor 120 iteratively calculating TH from the output signals from the sensors 150, comparing the calculated value with the thresholds 400 and 1200, and setting or clearing a respective flag according to whether TH is greater than 1200, less than 400, or between 400 and 1200. The state of the flags at any given moment will indicate whether the immediately preceding measurement detected sensor noise only, hand jitter or voluntary movement to a high degree of accuracy. This is done cyclically at least while the camera is in preview mode with the shutter button half-depressed, right up to the moment that the final full resolution image is captured. The final state of the flags at the moment the shutter is pressed can be stored as metadata with the image, and used in processing the image, e.g. as an input to the de-blur function 94 or alternatively, the state of the flag can be fed directly to the image processing function. During the preview phase the state of the flags can be used to determine whether to enable or disable an image stabilisation function or otherwise used as input to such a function to modify its operation.

In another application, the image processing functions include a face tracking module 96 as described in U.S. patent application Ser. No. 11/464,083 filed Aug. 11, 2006, now U.S. Pat. No. 7,315,631. Such a module periodically analyses acquired images to detect faces within the images and subsequently tracks these faces from one image to another in an image stream. Face detection is relatively processor intensive and needs to be performed as judiciously as possible. Thus, using the information provided with the present embodiment, the module 96 can for example decide to switch off face detection/tracking when a camera is being voluntarily moved as it might presume that it could not track face movement during panning of the camera, whereas if hand jitter is being experienced, the module can use the degree and direction of movement to attempt to predict where a face candidate region being tracked may have moved from one image in a stream to the next. If noise rather than hand jitter is being experienced, the module 96 could decide to use an existing location for a face candidate region rather than attempting to predict its location based on camera movement.

The invention is not limited to the embodiments described herein which may be modified or varied without departing from the scope of the invention.

The invention claimed is:

1. A digital camera-enabled portable device, comprising:
a lens and image sensor for acquiring digital images;
a processor;
at least one angular rate-sensing gyroscopic sensor;
an electronic circuit responsive to a sensor output signal to discriminate between voluntary and involuntary movements of the article as a function at least of the number of zero crossings per unit time of the signal; and
a face tracking module configured to detect and track a face within the images and to select an operating condition based on a determination as to whether the article is undergoing voluntary movement, and
wherein the operating condition comprises turning face tracking off upon determining that the article is undergoing voluntary movement.

2. The digital camera enabled portable device of claim 1, wherein the function is proportional to the number of zero crossings of the signal.

3. The digital camera enabled portable device of claim 1, including first and second angular rate-sensing gyroscopic sensors with transverse axes, the electronic circuit being responsive to both sensor output signals to discriminate between voluntary and involuntary movements of the article.

4. The digital camera-enabled portable device of claim 3, wherein the axes of the first and second angular rate-sensing gyroscopic sensors are substantially perpendicular to one another.

5. The digital camera-enabled portable device of claim 1, wherein the electronic circuit is responsive to the sensor output signal to discriminate between voluntary and involuntary movements of the article as a function also of the average of the absolute amplitude of the signal.

6. A digital camera-enabled portable device, comprising:
a lens and image sensor for acquiring digital images;
a processor;
at least one angular rate-sensing gyroscopic sensor;
an electronic circuit responsive to a sensor output signal to discriminate between voluntary and involuntary movements of the article as a function at least of the number of zero crossings per unit time of the signal; and
a face tracking module configured to detect and track a face within the images and to select an operating condition based on a determination as to whether the article is undergoing voluntary movement,
first and second angular rate-sensing gyroscopic sensors with transverse axes, the electronic circuit being responsive to both sensor output signals to discriminate between voluntary and involuntary movements of the article,
wherein the function is proportional to the number of zero crossings of the signal and inversely proportional to the average of the absolute amplitude of the signal.

7. The digital camera-enabled portable device of claim 6, wherein the electronic circuit discriminates between involuntary and voluntary movements by determining whether the function falls below a first threshold indicating voluntary movement or above the first threshold indicating no voluntary movement.

8. The digital camera-enabled portable device of claim 7, wherein the electronic circuit further discriminates between involuntary movements and sensor noise by determining whether the function falls below a second predetermined threshold greater than the first threshold indicating involuntary movement or above the second threshold indicating no movement.

9. A digital camera-enabled portable device, comprising:
a lens and image sensor for acquiring digital images;
a processor;
at least one angular rate-sensing gyroscopic sensor;
an electronic circuit responsive to a sensor output signal to discriminate between voluntary and involuntary movements of the article as a function at least of the number of zero crossings per unit time of the signal; and
a face tracking module configured to detect and track a face within the images and to select an operating condition based on a determination as to whether the article is undergoing voluntary movement,
wherein the electronic circuit is responsive to the sensor output signal to discriminate between voluntary and involuntary movements of the article as a function also of the average of the absolute amplitude of the signal, and
wherein the function is proportional to the number of zero crossings of the signal and inversely proportional to the average of the absolute amplitude of the signal.

10. The digital camera-enabled portable device of claim 9, wherein the electronic circuit discriminates between involuntary and voluntary movements by determining whether the function falls below a first threshold indicating voluntary movement, or above the first threshold indicating no voluntary movement.

11. The digital camera-enabled portable device of claim 10, wherein the electronic circuit further discriminates between involuntary movements and sensor noise when the function is above the first threshold by determining whether the function falls below a second predetermined threshold greater than the first threshold indicating involuntary movement, or above the second threshold indicating no movement.

12. The digital camera-enabled portable device of claim 11, wherein the face tracking module is further configured to select an operating condition based on a further determination as to whether the article is undergoing no movement.

13. The digital camera-enabled portable device of claim 12, wherein when the device is determined to have no movement, the operating condition comprises using an existing location for a face candidate region.

14. The digital camera-enabled portable device of claim 13, wherein the operating condition comprises not attempting to predict a location for the face based on any camera movement.

15. The digital camera-enabled portable device of claim 9, wherein the operating condition comprises turning face tracking off upon determining that the article is undergoing voluntary movement.

16. One or more non-transitory computer-readable storage device having code embedded therein for programming a processor to perform a method of tracking a face within multiple images of an image stream acquired with a digital camera-enabled portable device equipped with at least one angular rate-sensing gyroscope, wherein the method comprises:
receiving an angular rate-sensing gyroscopic sensor output signal;
calculating a value of a function at least of the number of zero crossings per unit time of the signal;

discriminating between voluntary and involuntary movements of the digital camera-enabled portable device based on the value; and detecting and tracking said face within the multiple images only when the device is not undergoing voluntary movement, wherein the detecting and tracking of said face comprises turning face tracking off upon determining that the device is undergoing voluntary movement.

17. The one or more computer-readable storage devices of claim 16, wherein the function is proportional to the number of zero crossings of the signal.

18. The one or more computer-readable storage devices of claim 16, wherein the device is equipped with first and second angular rate-sensing gyroscopic sensors with transverse axes, and the discriminating between voluntary and involuntary movements of the device comprises analyzing both sensor output signals.

19. The one or more computer-readable storage devices of claim 18, wherein the axes of the first and second angular rate-sensing gyroscopic sensors are substantially perpendicular to one another.

20. The one or more computer-readable storage devices of claim 16, wherein the function is also a function of the average of the absolute amplitude of the signal.

21. One or more non-transitory computer-readable storage device having code embedded therein for programming a processor to perform a method of tracking a face within multiple images of an image stream acquired with a digital camera-enabled portable device equipped with at least one angular rate-sensing gyroscope, wherein the method comprises:

receiving an angular rate-sensing gyroscopic sensor output signal;

calculating a value of a function at least of the number of zero crossings per unit time of the signal;

discriminating between voluntary and involuntary movements of the digital camera-enabled portable device based on the value;

detecting and tracking said face within the multiple images only when the device is not undergoing voluntary movement, wherein the device is equipped with first and second angular rate-sensing gyroscopic sensors with transverse axes, and the discriminating between voluntary and involuntary movements of the device comprises analyzing both sensor output signals, wherein the function is proportional to the number of zero crossings of the signal and inversely proportional to the average of the absolute amplitude of the signal.

22. The one or more computer-readable storage devices of claim 21, wherein the discriminating between involuntary and voluntary movements comprises determining whether the function falls below a first threshold indicating voluntary movement or above the first threshold indicating no voluntary movement.

23. The one or more computer-readable storage devices of claim 22, wherein the method further comprises discriminating between involuntary movements and sensor noise, including determining whether the function falls below a second predetermined threshold greater than the first threshold indicating involuntary movement or above the second threshold indicating no movement.

24. The one or more computer-readable storage devices of claim 21, wherein the detecting and tracking of said face comprises turning face tracking off upon determining that the device is undergoing voluntary movement.

25. One or more non-transitory computer-readable storage device having code embedded therein for programming a processor to perform a method of tracking a face within multiple images of an image stream acquired with a digital camera-enabled portable device equipped with at least one angular rate-sensing gyroscope, wherein the method comprises:

receiving an angular rate-sensing gyroscopic sensor output signal;

calculating a value of a function at least of the number of zero crossings per unit time of the signal;

discriminating between voluntary and involuntary movements of the digital camera-enabled portable device based on the value; and detecting and tracking said face within the multiple images only when the device is not undergoing voluntary movement wherein the function is also a function of the average of the absolute amplitude of the signal, wherein the function is proportional to the number of zero crossings of the signal and inversely proportional to the average of the absolute amplitude of the signal.

26. The one or more computer-readable storage devices of claim 25, wherein the discriminating between involuntary and voluntary movements comprises determining whether the function falls below a first threshold indicating voluntary movement, or above the first threshold indicating no voluntary movement.

27. The one or more computer-readable storage devices of claim 26, wherein the method further comprises discriminating between involuntary movements and sensor noise when the function is above the first threshold by determining whether the function falls below a second predetermined threshold greater than the first threshold indicating involuntary movement, or above the second threshold indicating no movement.

28. The one or more computer-readable storage devices of claim 27, wherein the detecting and tracking of said face further comprises selecting an operating condition based on a further determination as to whether the device is undergoing no movement.

29. The one or more computer-readable storage devices of claim 28, wherein when the device is determined to have no movement, the detecting and tracking of said face comprises using an existing location for a face candidate region.

30. The one or more computer readable storage devices of claim 29, wherein the detecting and tracking of said face does not include predicting its location based on any camera movement.

31. A method of tracking a face within multiple images of an image stream acquired with a digital camera-enabled portable device equipped with at least one angular rate-sensing gyroscope, wherein the method comprises:

receiving an angular rate-sensing gyroscopic sensor output signal;

calculating a value of a function at least of the number of zero crossings per unit time of the signal;

discriminating between voluntary and involuntary movements of the digital camera-enabled portable device based on the value; and detecting and tracking said face within the multiple images only when the device is not undergoing voluntary movement, and wherein the detecting and tracking of said face comprises turning face tracking off upon determining that the device is undergoing voluntary movement.

32. The method of claim 31, wherein the function is proportional to the number of zero crossings of the signal.

33. The method of claim 31, wherein the device is equipped with first and second angular rate-sensing gyroscopic sensors with transverse axes, and the discriminating between voluntary and involuntary movements of the device comprises analyzing both sensor output signals.

34. The method of claim 33, wherein the axes of the first and second angular rate-sensing gyroscopic sensors are substantially perpendicular to one another.

35. The method of claim 31, wherein the function is also a function of the average of the absolute amplitude of the signal.

36. A method of tracking a face within multiple images of an image stream acquired with a digital camera-enabled portable device equipped with at least one angular rate-sensing gyroscope, wherein the method comprises:
receiving an angular rate-sensing gyroscopic sensor output signal;
calculating a value of a function at least of the number of zero crossings per unit time of the signal;
discriminating between voluntary and involuntary movements of the digital camera-enabled portable device based on the value; and
detecting and tracking said face within the multiple images only when the device is not undergoing voluntary movement
wherein the device is equipped with first and second angular rate-sensing gyroscopic sensors with transverse axes, and the discriminating between voluntary and involuntary movements of the device comprises analyzing both sensor output signals,
wherein the function is proportional to the number of zero crossings of the signal and inversely proportional to the average of the absolute amplitude of the signal.

37. The method of claim 36, wherein the discriminating between involuntary and voluntary movements comprises determining whether the function falls below a first threshold indicating voluntary movement or above the first threshold indicating no voluntary movement.

38. The method of claim 37, further comprising discriminating between involuntary movements and sensor noise, including determining whether the function falls below a second predetermined threshold greater than the first threshold indicating involuntary movement or above the second threshold indicating no movement.

39. A method of tracking a face within multiple images of an image stream acquired with a digital camera-enabled portable device equipped with at least one angular rate-sensing gyroscope, wherein the method comprises:
receiving an angular rate-sensing gyroscopic sensor output signal;
calculating a value of a function at least of the number of zero crossings per unit time of the signal;
discriminating between voluntary and involuntary movements of the digital camera-enabled portable device based on the value; and
detecting and tracking said face within the multiple images only when the device is not undergoing voluntary movement,
wherein the function is also a function of the average of the absolute amplitude of the signal,
wherein the function is proportional to the number of zero crossings of the signal and inversely proportional to the average of the absolute amplitude of the signal.

40. The method of claim 39, wherein the discriminating between involuntary and voluntary movements comprises determining whether the function falls below a first threshold indicating voluntary movement, or above the first threshold indicating no voluntary movement.

41. The method of claim 40, further comprising discriminating between involuntary movements and sensor noise when the function is above the first threshold by determining whether the function falls below a second predetermined threshold greater than the first threshold indicating involuntary movement, or above the second threshold indicating no movement.

42. The method of claim 41, wherein the detecting and tracking of said face further comprises selecting an operating condition based on a further determination as to whether the device is undergoing no movement.

43. The method of claim 42, wherein when the device is determined to have no movement, the detecting and tracking of said face comprises using an existing location for a face candidate region.

44. The method of claim 43, wherein the detecting and tracking of said face does not include predicting its location based on any camera movement.

45. The method of claim 39, wherein the detecting and tracking of said face comprises turning face tracking off upon determining that the device is undergoing voluntary movement.

* * * * *